United States Patent
Suzuki et al.

(10) Patent No.: US 9,601,071 B2
(45) Date of Patent: *Mar. 21, 2017

(54) LIQUID CRYSTAL DISPLAY DEVICE

(71) Applicant: Japan Display Inc., Minato-ku (JP)

(72) Inventors: Daiichi Suzuki, Tokyo (JP); Yukio Tanaka, Tokyo (JP); Kenji Nakao, Tokyo (JP); Kazuhiro Nishiyama, Tokyo (JP); Shinichi Komura, Tokyo (JP); Shinichiro Oka, Tokyo (JP); Mika Oiwa, Tokyo (JP)

(73) Assignee: Japan Display Inc., Minato-ku (JP)

( * ) Notice: Subject to any disclaimer, the term of this patent is extended or adjusted under 35 U.S.C. 154(b) by 123 days.

This patent is subject to a terminal disclaimer.

(21) Appl. No.: 14/510,471

(22) Filed: Oct. 9, 2014

(65) Prior Publication Data

US 2015/0102988 A1    Apr. 16, 2015

(30) Foreign Application Priority Data

Oct. 11, 2013    (JP) .................. 2013-213566

(51) Int. Cl.
  *G09G 3/36*    (2006.01)
  *G02F 1/1343*    (2006.01)

(52) U.S. Cl.
  CPC ............ *G09G 3/3648* (2013.01); *G02F 2001/134372* (2013.01); *G09G 2320/0247* (2013.01); *G09G 2340/0435* (2013.01)

(58) Field of Classification Search
  None
  See application file for complete search history.

(56) References Cited

U.S. PATENT DOCUMENTS

| 2002/0093473 | A1 | 7/2002 | Tanaka et al. |
| 2008/0170028 | A1* | 7/2008 | Yoshida ............... G09G 3/2085 345/100 |
| 2008/0284929 | A1* | 11/2008 | Kimura ............... G02F 1/13624 349/38 |
| 2010/0309419 | A1 | 12/2010 | Oka et al. |
| 2014/0085356 | A1* | 3/2014 | Tanaka ................. G09G 3/3696 345/691 |
| 2015/0035816 | A1* | 2/2015 | Suzuki ................ G09G 3/3614 345/209 |

FOREIGN PATENT DOCUMENTS

| JP | 2002-278523 | 9/2002 |
| JP | 2010-282037 | 12/2010 |

* cited by examiner

*Primary Examiner* — Srilakshmi K Kumar
*Assistant Examiner* — Henok Heyi
(74) *Attorney, Agent, or Firm* — Oblon, McClelland, Maier & Neustadt, L.L.P.

(57) ABSTRACT

According to one embodiment, a lateral electric-field type of liquid crystal display device includes a display panel and a controller, wherein a frame frequency falls within a range of 1 Hz to 10 Hz, an off-leak current of each of the TFTs has a value of $1\times10^{-15}$ A or less, a resistivity of a liquid crystal and a resistivity of an alignment film both fall within one of a first range and a second range, the first range being $1\times10^{13}$ to $5\times10^{13}$ Ω·cm, the second range being $5\times10^{13}$ to $5\times10^{14}$ Ω·cm, and a relationship of "$R1\times C1 \approx R2\times C2$" is satisfied, where R1 is a resistance and C1 is a capacity with respect to each pixel, R2 is a resistance and C2 is a capacity with respect to each pixel.

2 Claims, 16 Drawing Sheets

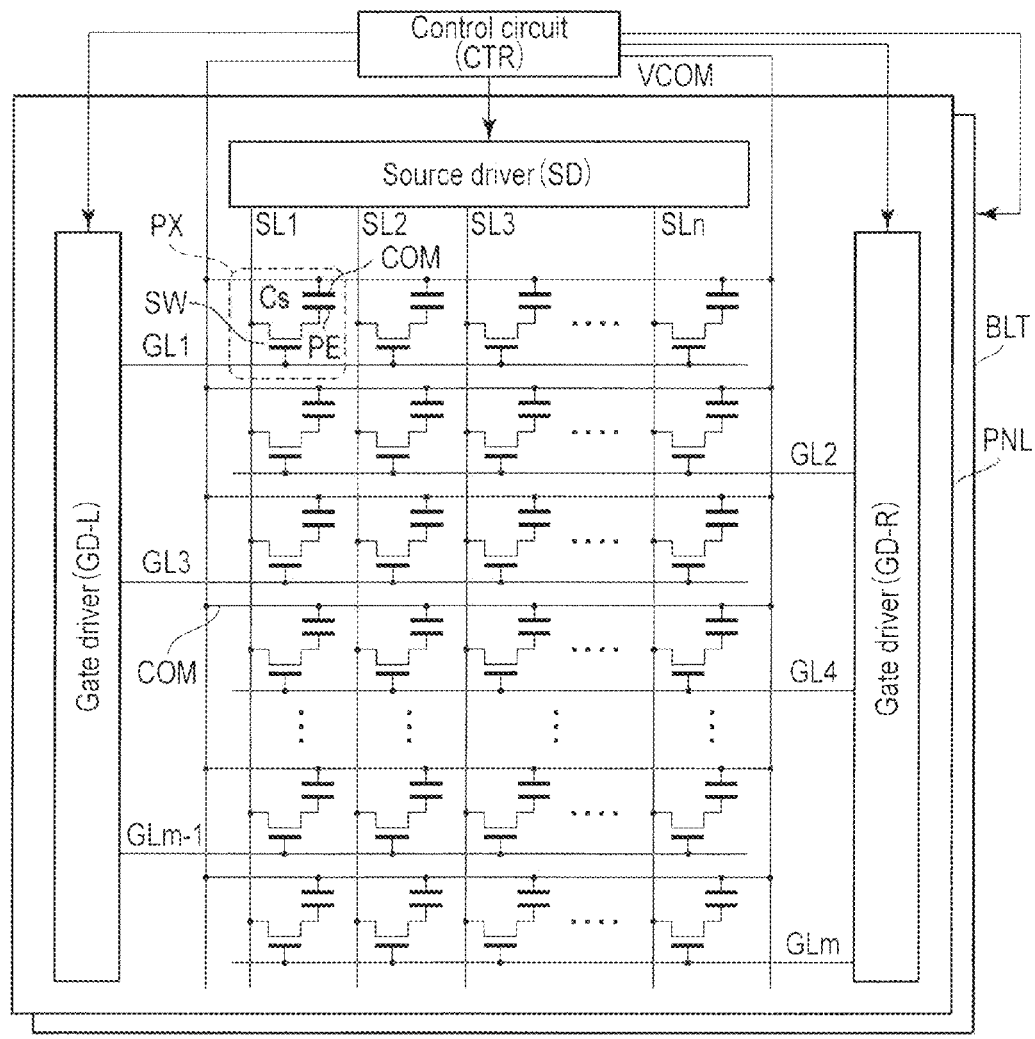
F I G. 1

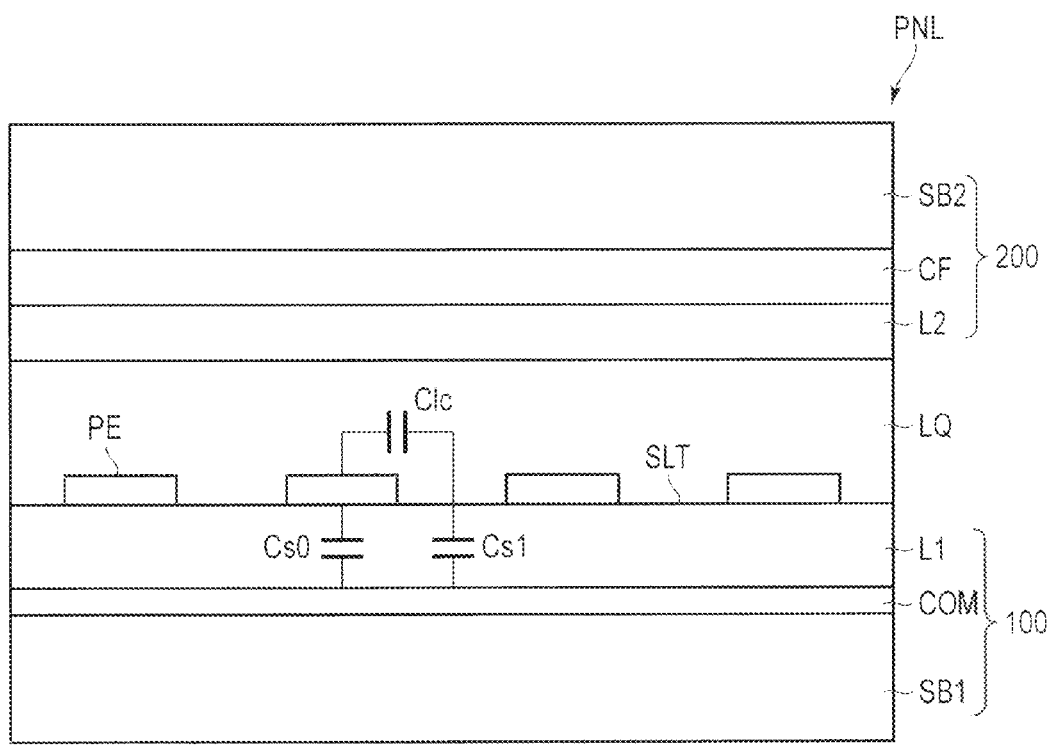
F I G. 2

Standardized fluctuation range pp value of luminance

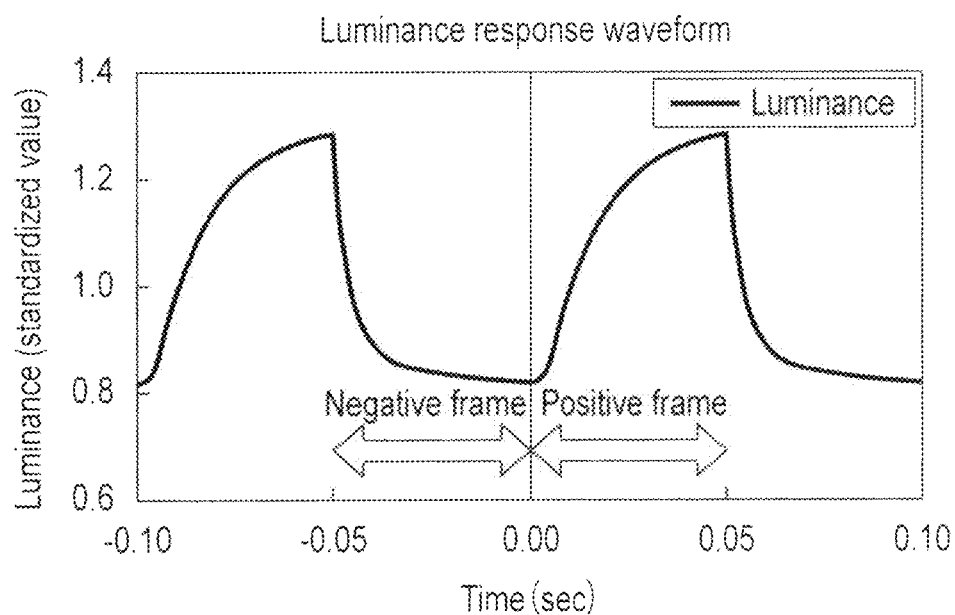
F I G. 6A
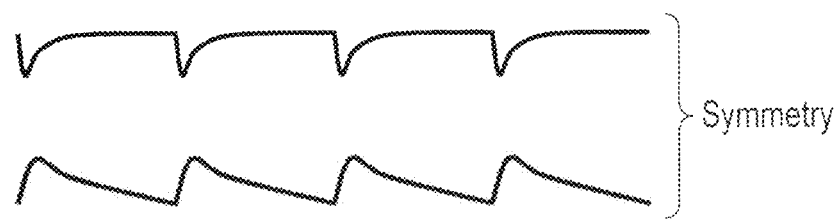
F I G. 6B
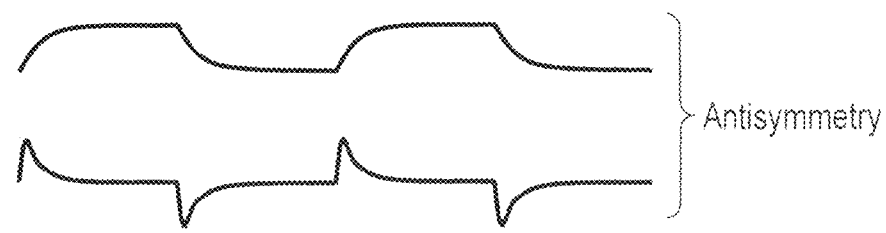
F I G. 6C

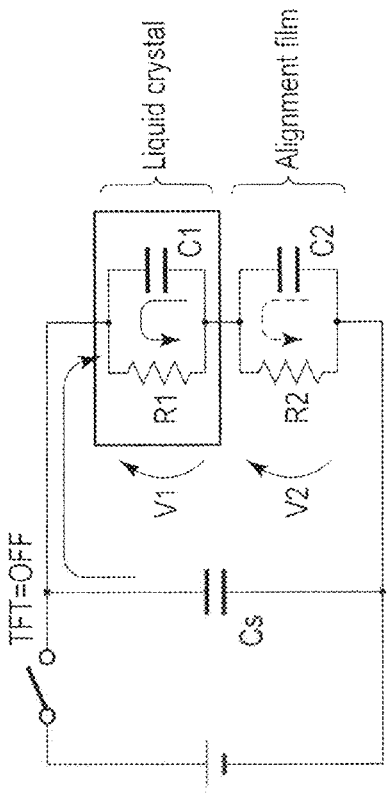
F I G. 7A
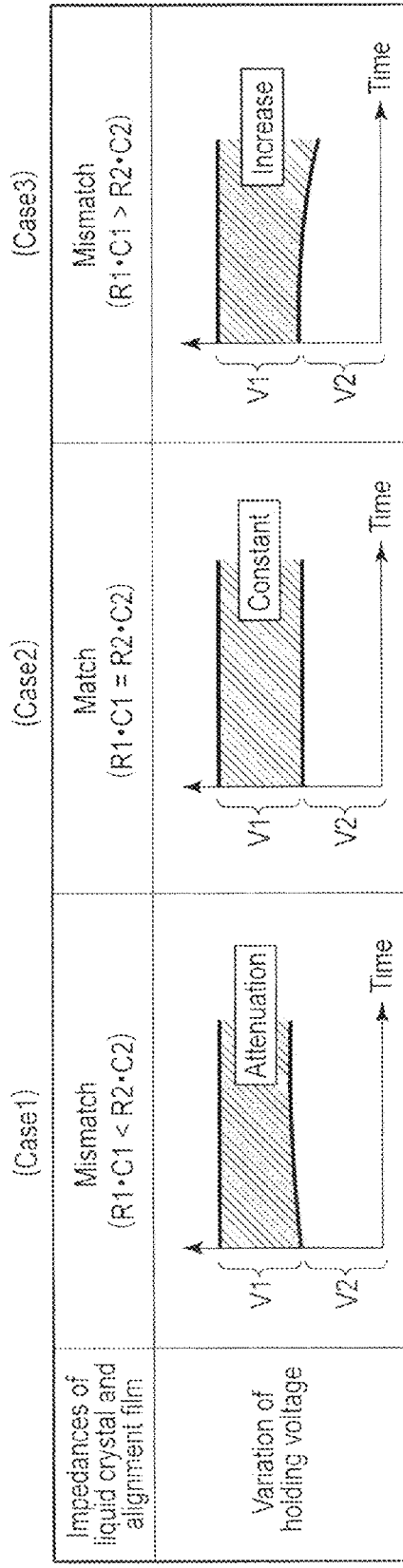
F I G. 7B

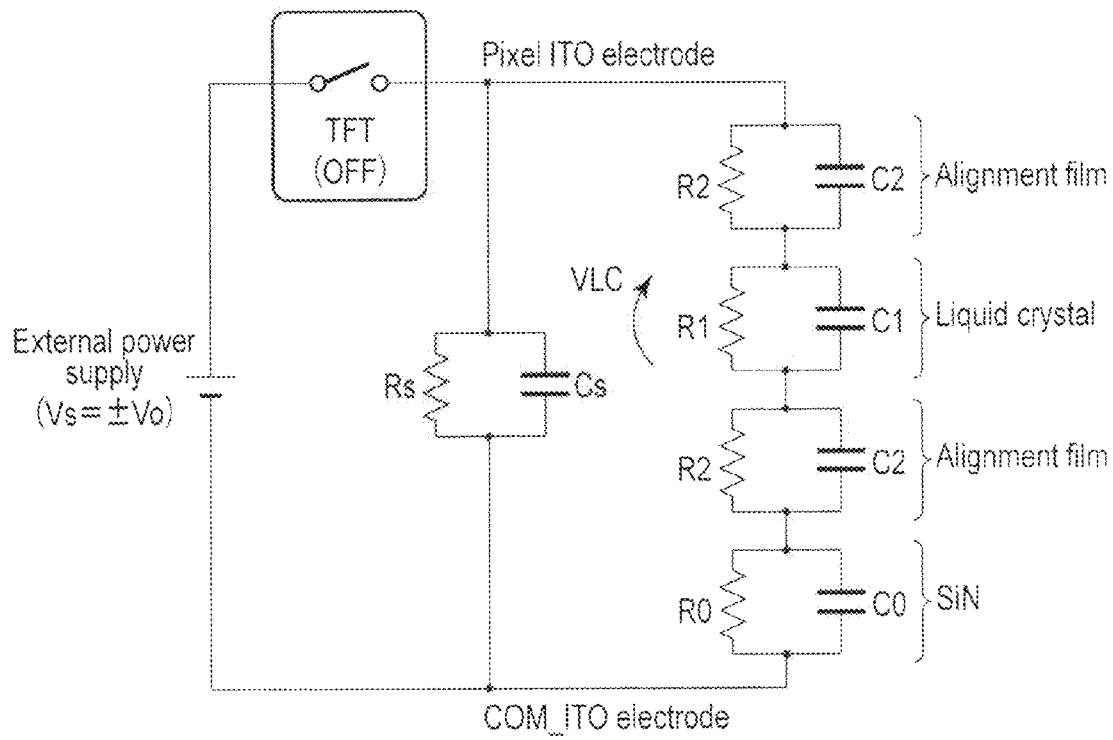
F I G. 8A
| | Relative dielectric constant | Capacitance ratio |
|---|---|---|
| SiN (Cs) | 6.10 | 0.5000 |
| SiN (C0) | 6.10 | 1.0000 |
| Alignment film (C2) | 4.00 | 1.1803 |
| Liquid crystal (C1) | 4.00 | 0.3000 |
F I G. 8B Change rate of liquid crystal applied voltage in holding period Change rate of liquid crystal applied voltage = $(Vf-Vi)/Vi$

| | Impedance match between liquid crystal and alignment film | | TFT off-leak current [A] | Frame frequency |
|---|---|---|---|---|
| | Resistivity of liquid crystal | Resistivity of alignment film | | |
| Case1 | $5 \times 10^{13} \sim 5 \times 10^{14}$ | $5 \times 10^{13} \sim 5 \times 10^{14}$ | $10^{-15}$ or less | $1 \sim 10$Hz |
| Case2 | $1 \times 10^{13} \sim 5 \times 10^{13}$ | $1 \times 10^{13} \sim 5 \times 10^{13}$ | $10^{-15}$ or less | $1 \sim 10$Hz |
| Case3 | $5 \times 10^{12} \sim 5 \times 10^{14}$ | $5 \times 10^{12} \sim 5 \times 10^{13}$ | $10^{-15}$ or less | $10 \sim 20$Hz |
| Case4 | $1 \times 10^{12} \sim 5 \times 10^{12}$ | $1 \times 10^{12} \sim 5 \times 10^{12}$ | $10^{-15}$ or less | $10 \sim 20$Hz |
| Case5 | $5 \times 10^{12} \sim 5 \times 10^{14}$ | $5 \times 10^{11} \sim 5 \times 10^{13}$ | $10^{-14}$ or less | $10 \sim 20$Hz |
| Case6 | $1 \times 10^{12} \sim 5 \times 10^{12}$ | $1 \times 10^{11} \sim 5 \times 10^{11}$ | $10^{-14}$ or less | $10 \sim 20$Hz |
| Case7 | $5 \times 10^{12} \sim 5 \times 10^{14}$ | $1 \times 10^{11} \sim 5 \times 10^{13}$ | $10^{-13}$ or less | $10 \sim 20$Hz |
| Case8 | $1 \times 10^{12} \sim 5 \times 10^{12}$ | $5 \times 10^{10} \sim 1 \times 10^{11}$ | $10^{-13}$ or less | $10 \sim 20$Hz |
| Case9 | $5 \times 10^{13} \sim 5 \times 10^{14}$ | $1 \times 10^{14} \sim 5 \times 10^{14}$ | $10^{-15}$ or less | $1 \sim 10$Hz |
| Case10 | $5 \times 10^{12} \sim 5 \times 10^{14}$ | $1 \times 10^{13} \sim 5 \times 10^{14}$ | $10^{-15}$ or less | $10 \sim 20$Hz |

F I G. 10

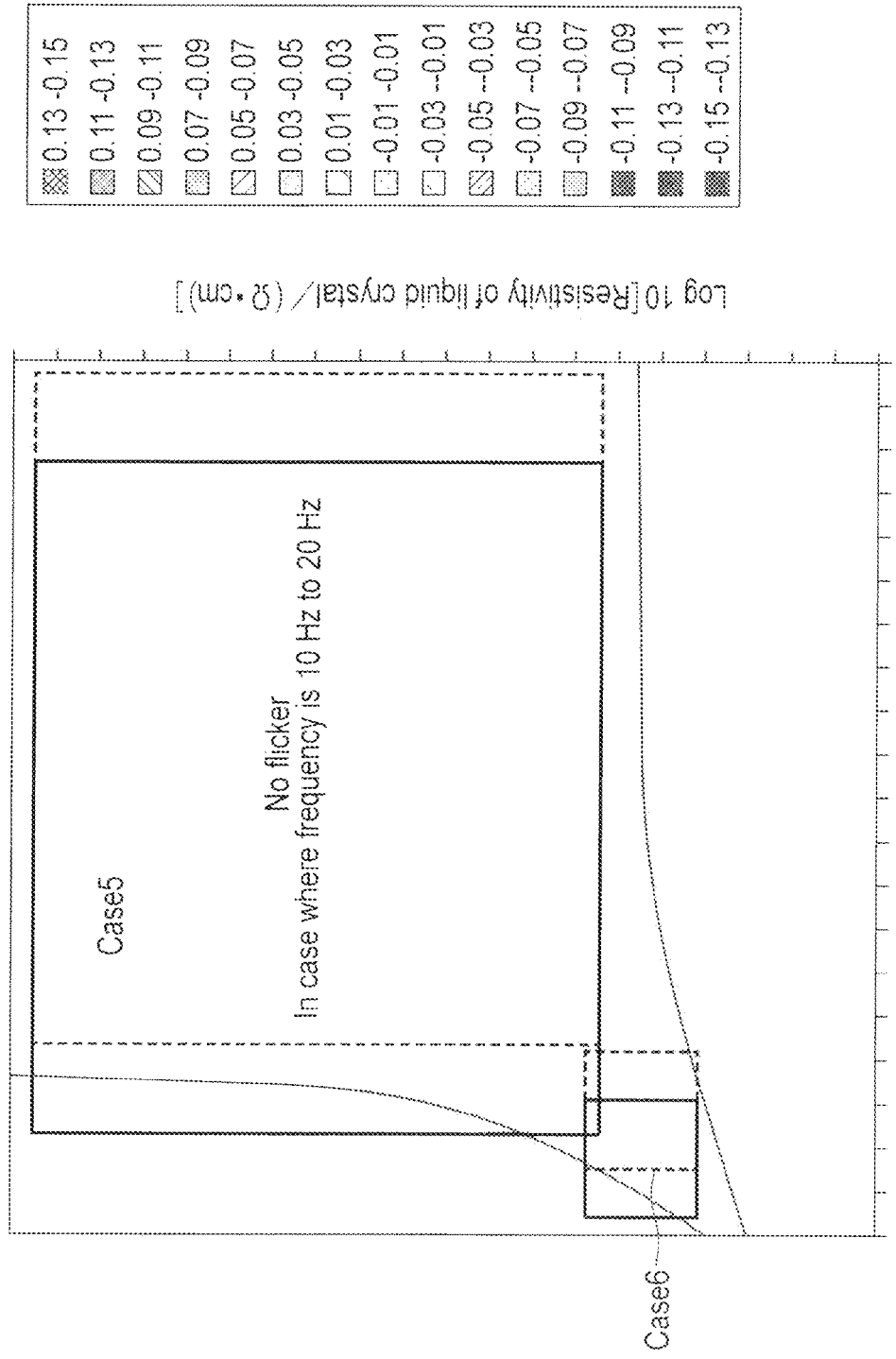
F I G. 13

LIQUID CRYSTAL DISPLAY DEVICE

CROSS-REFERENCE TO RELATED APPLICATIONS

This application is based upon and claims the benefit of priority from Japanese Patent Application No. 2013-213566, filed Oct. 11, 2013, the entire contents of which are incorporated herein by reference.

FIELD

Embodiments described herein relate generally to a liquid crystal display device.

BACKGROUND

Liquid crystal display devices are provided in various devices, for example, a television device, a vehicle-mounted display such as a car navigation device, and mobile terminals such as a notebook personal computer, a tablet PC, a cell phone, and a smart phone.

Such liquid crystal display devices adopt various mode liquid crystals which are applied in accordance with purposes.

For example, in a vertical electric field type of liquid crystal display device such as a twisted nematic (TN) mode liquid crystal display device or an optically compensated bend (OCB) mode liquid crystal display device, an alignment direction of liquid crystal molecules included in a liquid crystal layer held between an upper substrate and a lower substrate is controlled by an electric field generated between a counter-electrode provided in the upper substrate and pixel electrodes provided in the lower substrate.

Furthermore, in a lateral electric field type of liquid crystal display device such as an in-plane switching (IPS) mode liquid crystal display device or a fringe-field switching (FFS) mode liquid crystal display device, a counter-electrode (referred to as a COM electrode in this type) and pixel electrodes are provided in the same substrate, and an alignment direction of liquid crystal display molecules included in a liquid crystal layer is controlled by an electric field (fringe electric field) generated between the counter-electrode and the pixel electrodes. The FFS mode liquid crystal display device can ensure a great aperture ratio, and thus has a high luminance and a good viewing angle characteristic.

It should be noted that a liquid crystal display device for use in a mobile terminal is strongly required to reduce the power consumption of a circuit, and a low-frequency driving method, an intermittent driving method, etc. are proposed as means for reducing the power consumption of the circuit. The low-frequency driving method is a method of reducing the power of the circuit by lowering a drive frequency of the liquid crystal display device to, e.g., ½ or ¼ of that under standard conditions. The intermittent driving method is a method of reducing the power of the circuit by stopping the circuit for a time period corresponding to several display time periods after writing is performed for a single display time period. In both those driving methods, a period of rewriting a video signal in a liquid crystal display unit is long. Thus, those driving methods are not suitable for displaying of moving images. However, they can be effectively applied, as methods for lowering the power of the circuit, to displaying of a still image or the like whose visibility is held in little account.

If the low-frequency driving method or the intermittent driving method is applied to a liquid crystal display device, it is necessary to reduce a flicker.

For example, in the case where a frame frequency was 60 Hz, which is applied in an ordinary liquid crystal display device, a flicker was not visibly recognized. On the other hand, in the case where the frame frequency was 20 Hz, which is ⅓ of 60 Hz, a flicker was visibly recognized. Furthermore, in the case where the frame frequency was further lowered, a flicker was more remarkably visibly recognized.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a plan view schematically showing a structure of a liquid crystal display device according to an embodiment;

FIG. 2 is a view showing a cross section of a display pixel portion of a liquid crystal display panel of the liquid crystal display device according to the embodiment;

FIG. 6A is a view showing a luminance response waveform in the liquid crystal display according to the embodiment;

FIG. 6B is a view for use in explaining a symmetric component with respect to the liquid crystal display device according to the embodiment;

FIG. 6C is a view for use in explaining an antisymmetric component with respect to the liquid crystal display device according to the embodiment;

FIG. 7A is a view showing an equivalent circuit in the liquid crystal display panel of the liquid crystal display device according to the embodiment;

FIG. 7B is a view for use in explaining a variation of a liquid crystal holding voltage, which is caused by an impedance mismatch between liquid crystal and an alignment film in the liquid crystal display device according to the embodiment;

FIG. 8A is a view showing a circuit model applied to a simulation with respect to the liquid crystal display device according to the embodiment;

FIG. 8B is a view showing calculation conditions applied to the simulation with respect to the liquid crystal display device according to the embodiment;

FIG. 10 is a view showing for reducing a flicker in the liquid crystal display device according to the embodiment;

FIG. 13 is a view showing regions regarding impedances of liquid crystals and alignment films in cases 5 and 6 in the liquid crystal display device according to the embodiment;

DETAILED DESCRIPTION

Figure 3A:
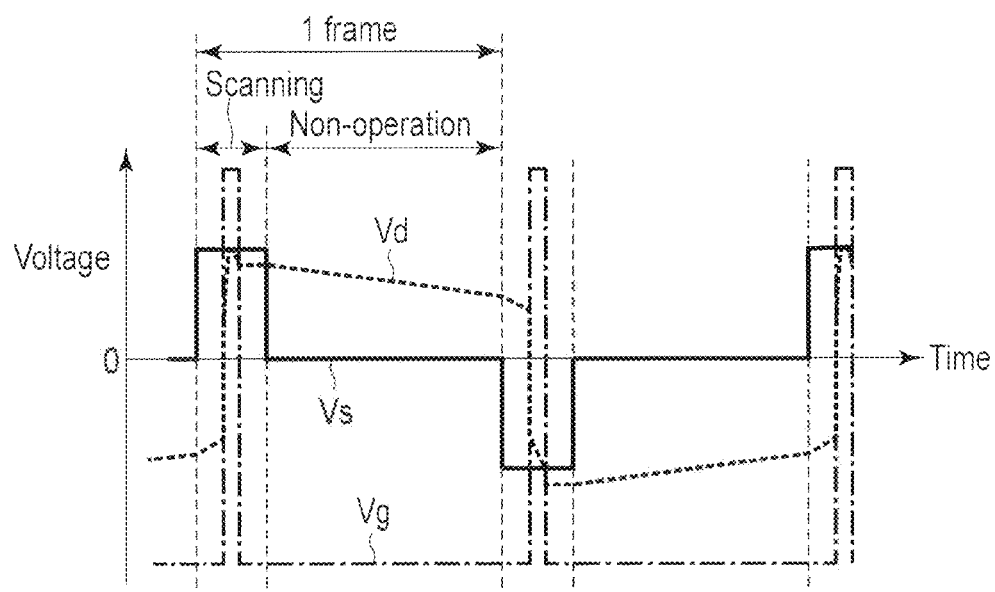
FIG. 3A is a view showing an example of a luminance change with respect to the liquid crystal display device according to the embodiment.

Various embodiments will be described hereinafter with reference to the accompanying drawings.

In general, according to one embodiment, a lateral electric-field type of liquid crystal display device comprising: a display panel in which a plurality of liquid crystal pixels and TFTs are arranged in a matrix, the TFTs being configured to perform or stop application of pixel voltages to the liquid crystal pixels; and a controller configured to perform intermittent driving to rewrite image signals to the liquid crystal pixels, wherein a frame frequency falls within a range of 1 Hz to 10 Hz, an off-leak current of each of the TFTs has a value of $1\times10^{-15}$ A or less, a resistivity of a liquid crystal applied to each of the liquid crystal pixels and a resistivity of an alignment film applied to the liquid crystal pixels both fall within one of a first range and a second range, the first range being set as a range of $1\times10^{13}$ to $5\times10^{13}$ Ω·cm, the second range being set as a range of $5\times10^{13}$ to $5\times10^{14}$ Ω·cm, and a relationship of "$R1\times C1 \approx R2\times C2$" is satisfied, where R1 is a resistance of the liquid crystal with respect to said each liquid crystal pixel, C1 is a capacity of the liquid crystal with respect to said each liquid crystal pixel, R2 is a resistance of the alignment film with respect to said each liquid crystal pixel, and C2 is a capacity of the alignment film with respect to said each liquid crystal pixel.

The liquid crystal display device according to the embodiment will be explained in detail with reference to the accompanying drawings.

FIG. 1 is a schematic plan view showing a structure of the liquid crystal display device according to the embodiment.

The liquid crystal display device comprises a liquid crystal display panel PNL and a backlight BLT which illuminates the liquid crystal display panel PNL from a rear surface side. The liquid crystal display panel PNL is provided with a display portion including display pixels PX arranged in a matrix.

FIG. 2 is a view showing a cross section of a display pixel portion of the liquid crystal display panel PNL of the liquid crystal display device according to the embodiment.

The liquid crystal display panel PNL comprises an array substrate 100, a counter-substrate 200 and a liquid crystal layer LQ held between the substrates 100 and 200.

In the counter-substrate 200, a transparent insulating substrate SB2, a color filter layer CF and an overcoat layer L2 are provided. The color filter layer CF includes colored layers provided on the transparent insulating substrate SB2, which are colored red (R), green (G) and blue (B). The overcoat layer L2 is provided to cover the color filter layer CF, and prevents substances contained in the color filter layer CF from flowing into the liquid crystal layer LQ.

The array substrate 100 comprises a transparent insulating substrate SB1, a counter-electrode (first electrode) COM, and a plurality of pixel electrodes (second electrodes) PE. The pixel electrodes PE are provided on the counter-electrode COM, with an insulating layer L1 interposed between the pixel electrodes PE and the counter-electrode COM, the insulating layer L1 being formed of silicon nitride (SiN). The pixel electrodes PE are provided in display pixels PX, respectively, and include opening portions SLT each formed in the shape of a slit. The counter-electrode COM and the pixel electrodes PE are transparent electrodes formed of, e.g., indium tin oxide (ITO).

As shown in FIG. 1, at the display portion, the array substrate 100 includes scanning lines GL (GL1, GL2, . . . ) extending along columns of display pixels PX, signal lines (SL1, SL2, . . . ) extending along rows of display pixels PX, and pixel switches SW provided close to intersections of the scanning lines GL and the signal lines SL.

The pixel switches SW comprise thin film transistors (TFTs). The pixel switches SW include gate electrodes which are electrically connected to associated scanning lines GL, respectively. Also, the pixel switches SW include source electrodes which are electrically connected to associated signal lines SL, respectively. Furthermore, the pixel switches SW include drain electrodes which are electrically connected to associated pixel electrodes PE, respectively.

The array substrate 100 comprises a source driver SD and gate drivers GD (a left gate driver GD-L and a right gate driver GD-R) as drive means for driving the display pixels PX. The scanning lines GL are electrically connected to output terminals of the gate drivers GD. The signal lines SL are electrically connected to output terminals of the source driver SD.

The gate drivers GD and the source driver SD are provided in peripheral areas of the display portions. The gate drivers GD successively apply on-voltages to scanning lines GL, as a result of which the on-voltages are applied to the gate electrodes of the pixel switches SW, which are electrically connected to selected scanning lines GL, i.e., the above scanning lines GL. To be more specific, when an on-voltage is applied to a gate electrode, electrical conduction is effected between the source electrode and drain electrode of a pixel switch SW including the above gate electrode. On the other hand, the source driver SD supplies output signals to the signal lines SL, respectively. To be more specific, when an output signal is supplied to a signal line SL, it is also supplied, through the pixel switch SW in which electrical conduction is effected between its source and drain electrodes, to an associated pixel electrode PE.

Operations of the gate drivers GD and the source driver SD are controlled by a control circuit CTR provided outside the liquid crystal display panel PNL. Furthermore, the control circuit CTR applies a counter-voltage Vcom to the counter-electrode COM, and also controls an operation of the backlight BLT.

The control circuit CTR has a function of performing intermittent driving to reduce electric power, in addition to a function of performing ordinary driving. It should be noted that a time period in which a single frame is rewritten is referred to as a "frame period" and its reciprocal is as a "frame frequency". This will also be applied to the intermittent driving and low-frequency driving of the present application.

Suppose by way of example a standard frame frequency of the liquid crystal display device is 60 Hz (a single frame is rewritten every 1/60 sec). In the case of displaying moving images, the liquid crystal display device is operated at 60 Hz, which is the standard frame frequency, and in the case of displaying a still image or the like whose visibility is held in little account, the control circuit CTR performs intermittent driving.

The control circuit CTR sets a non-operation period of, e.g., 1/60 sec, 3/60 sec, 7/60 sec or 59/60 sec after performing a writing operation (scanning from an upper side of a screen to a lower side thereof) for 1/60 sec. In the non-operation period, by stopping the writing operation of the control circuit CTR, the power consumption of the circuit is made substantially zero. As a result, the time-averaged power consumption of the circuit in all time periods including the time of performing the writing operation is reduced to 1/2, 1/4, 1/8 or 1/60 of that in the case where the non-operation period is not provided.

The liquid crystal display device according to the embodiment is a fringe-field switching (FFS) mode liquid crystal display device in which a liquid crystal layer LQ is caused to generate an electric field due to a potential difference between voltages applied to the counter-electrode COM and the pixel electrodes PE, to control an alignment direction of liquid crystal molecules in the liquid crystal layer. The transmission amount of light emitted from the backlight BLT is controlled in accordance with the alignment direction of the liquid crystal molecules.

As shown in FIG. 2, a capacitance component CsO generates between each of the pixel electrodes PE and the counter-electrode COM, which are located opposite to each other, with the insulating layer L1 interposed between them. In addition, a liquid crystal capacitance Clc and an auxiliary capacitance component Cs1 corresponding to an electric field generated in the liquid crystal layer LQ are present. Where a total capacitance, which corresponds to all the capacitances between the pixel electrodes PE and the counter-electrode COM, is denoted by Cs, the capacitance Cs is considered to be provided between the drain of the TFT and the counter-electrode COM.

Next, a driving method for reducing a flicker will be explained.

If a DC voltage is applied to liquid crystal material for long time, a display characteristic thereof varies due to charging-up with the passage of time. Thus, in general, frame driving is applied. In the frame driving, driving is performed such that the polarity is inverted in units of one frame to make a DC average substantially zero. However, if positive and negative response characteristics (luminance-voltage characteristics) are different from each other, the luminances of positive and negative frames are also different from each other, and the luminance fluctuates each time the frame changes, thus causing a flicker. Although the flicker can be minimized by applying a minute offset voltage for an average (DC average value) of signals inverted in polarity or adjusting a potential of the counter-electrode, it is impossible to suppress the flicker by completely absorbing a change of the brightness-voltage characteristic which occurs as time passes, a variance in optimal condition between gradation levels, etc.

As measures for reducing such a flicker, e.g., a line-inversion drive scheme, a column-inversion drive scheme and a dot-inversion drive scheme are known. For example, in the line-inversion drive scheme, a temporal phase of polarity inversion is set such that the polarity is inverted between positive and negative polarities in units of one row, thereby causing the difference between positive and negative luminance responses to be macroscopically zero, and preventing the flicker from being visibly recognized. Similarly, in the column-inversion drive scheme, the phase of polarity inversion is reversed in units of one column, and in the dot-inversion drive scheme, the pixel electrodes PE arranged in a matrix are inverted in polarity in a checkerwise manner; that is, dot inversion is carried out. Thus, the column-inversion drive scheme and the dot-inversion drive scheme can also prevent a flicker from being visibly recognized.

Of those inversion drive schemes, the line-inversion drive scheme and the dot-inversion drive scheme are carried out such that at the time of performing scanning over the screen, writing to pixels is carried out while inverting the polarity in units of one row, as a result of which it is therefore necessary to perform charging and discharging of signal lines in a panel at intervals of 1 horizontal period (1 H period), and the power consumption is increased. On the other hand, in the column-inversion drive scheme, the polarity is not inverted in a column direction where rows of pixels are arranged, and the power consumption of the circuit is reduced. In this regard, the column-inversion drive scheme has an advantage. In a liquid crystal display device for use in a mobile device, although any of various inversion drive scheme is adopted in accordance with specifications of a product, it is most preferable that the column-inversion drive scheme be applied in order to reduce the power consumption.

Then, a luminance response waveform of the liquid crystal display device will be explained.

In the intermittent drive scheme, after an associated pixel voltage is applied to a respective one of pixels PX, it is necessary that the pixel voltage is held for a long time period. Thus, it is also necessary to take measures for a luminance change which occurs due to an off-leak current of a TFT.

Figure 3B:
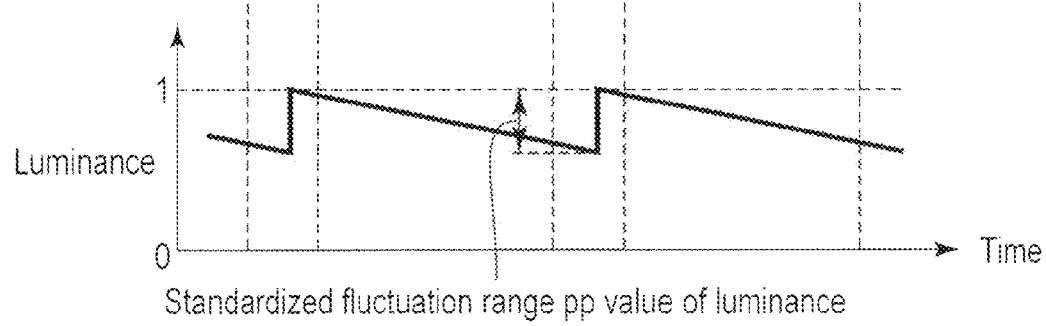
FIG. 3B is another view showing the example of the luminance change with respect to the liquid crystal display device according to the embodiment.

FIGS. 3A and 3B are views showing an example of a luminance change in the liquid crystal display device according to the embodiment. To be more specific, FIG. 3A shows changes of a pixel voltage Vd, a signal line voltage Vs and a gate voltage Vg; and FIG. 3B shows a change of a luminance of a liquid crystal.

In a scanning period of a single frame, the source driver SD outputs signal line voltages Vs associated with image signals to signal lines SL. Then, the gate driver GD outputs a gate voltage Vg for turning on TFTs to a scanning line GL. Thereby, pixel voltages Vd are equalized to the signal line voltages Vs, as a result of which the luminances of pixels are each set to a desired value.

In a non-operation period of the single frame, the gate voltage Vg is at a level at which it turns off TFTs, and for a short time period, the pixel voltages Vd are held at the levels of the signal line voltages Vs. However, if the non-operation period is long, the pixel voltages Vd lower due to the off-leak currents of the TFTs (currents leaking and flowing from, for example, drains of the TFTs to sources thereof). As a result, in the non-operation period, the luminances of the pixels lower.

When a subsequent frame is started, and the pixel voltages Vd are rewritten with new signal line voltages Vs, the luminances of the pixels each return to the desired value. It should be noted that referring to FIG. 3A, the polarity of a pixel voltage Vd changes in a subsequent frame. This is because a frame-inversion driving is performed. A luminance change, which is caused by off-leak currents of TFTs, is repeatedly made each time the frame changes. Thus, a flicker is visibly recognized.

It should be noted that a luminance as shown in FIG. 3B is standardized such that the desired value is 1. The value by which the standardized luminance is lowered by the off-leak current will be referred to as a standardized fluctuation range PP value of the luminance.

It is known that in general, the visibility with which a person can view a flicker depends on a frequency, and with respect to frequencies, even if the luminance fluctuates in the same fluctuation range, a flicker is more easily visibly as the frequency lowers.

Figure 4:
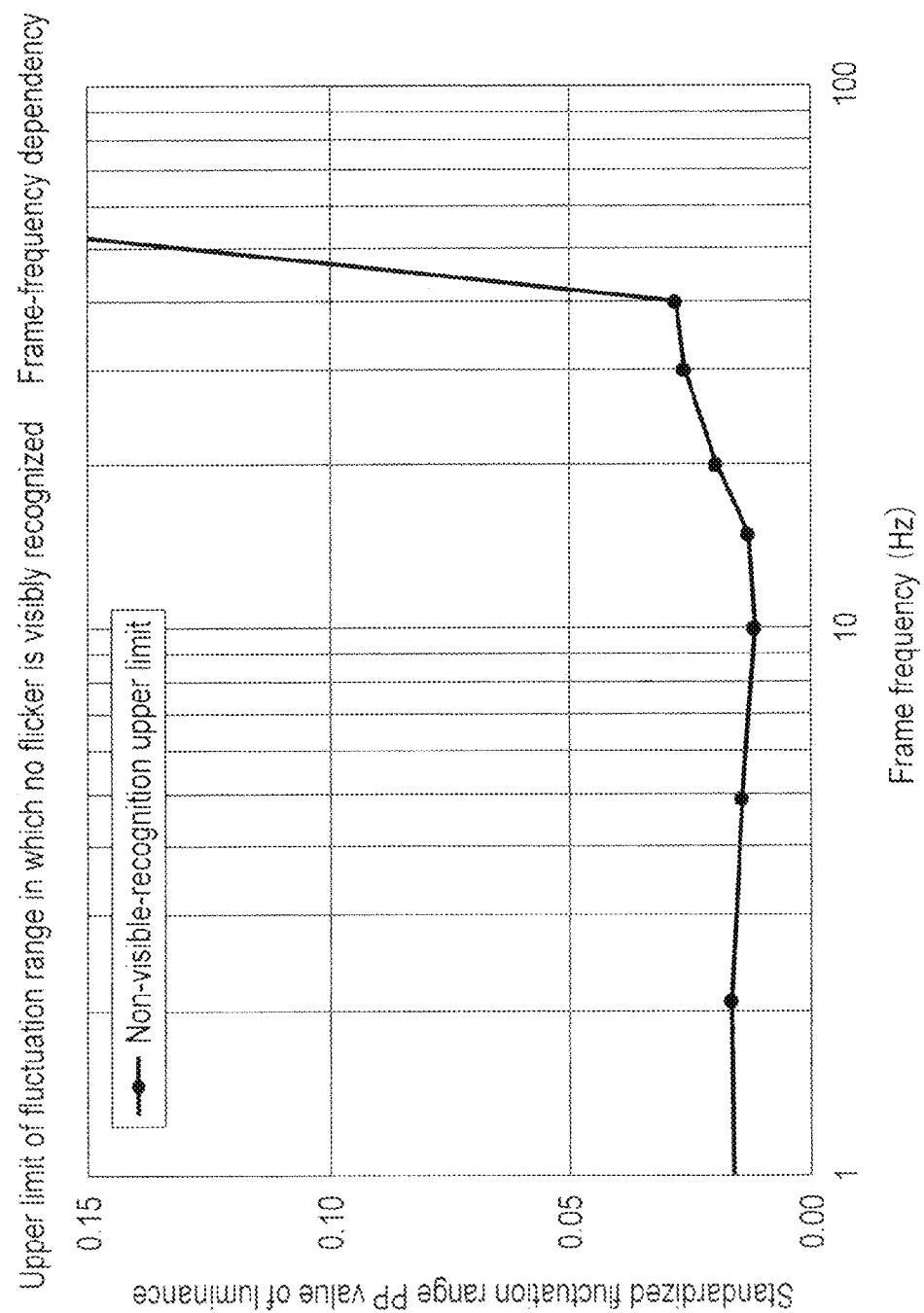
FIG. 4 is a view obtained by subjectively evaluating a relationship between a frame frequency and an upper limit of a standardized fluctuation range PP value of a luminance in which a flicker is not visibly recognized.

FIG. 4 is a view obtained by subjectively evaluating a relationship between a frame frequency and an upper limit of a standardized fluctuation range PP value of the luminance in which a flicker cannot be visibly recognized. According to a graph shown in the view, the upper limit steeply rises when the frame frequency exceeds 40 Hz. This means that in the case where the frame frequency is greater than 40 Hz, even if the fluctuation range of the luminance is great, a flicker is not visibly recognized; however, in the case where the frame frequency is equal to or smaller than 40 Hz, even if the fluctuation range of the luminance is small, a flicker is visibly recognized.

From the above result of the subjective evaluation, it can be considered that if the luminance fluctuates to such a degree as shown in FIG. 3B, a flicker is not visibly recognized when the frame frequency is 60 Hz, which is an ordinary frame frequency; however, a flicker is visibly recognized when the frame frequency is lowered to 40 Hz or less.

Figure 5:
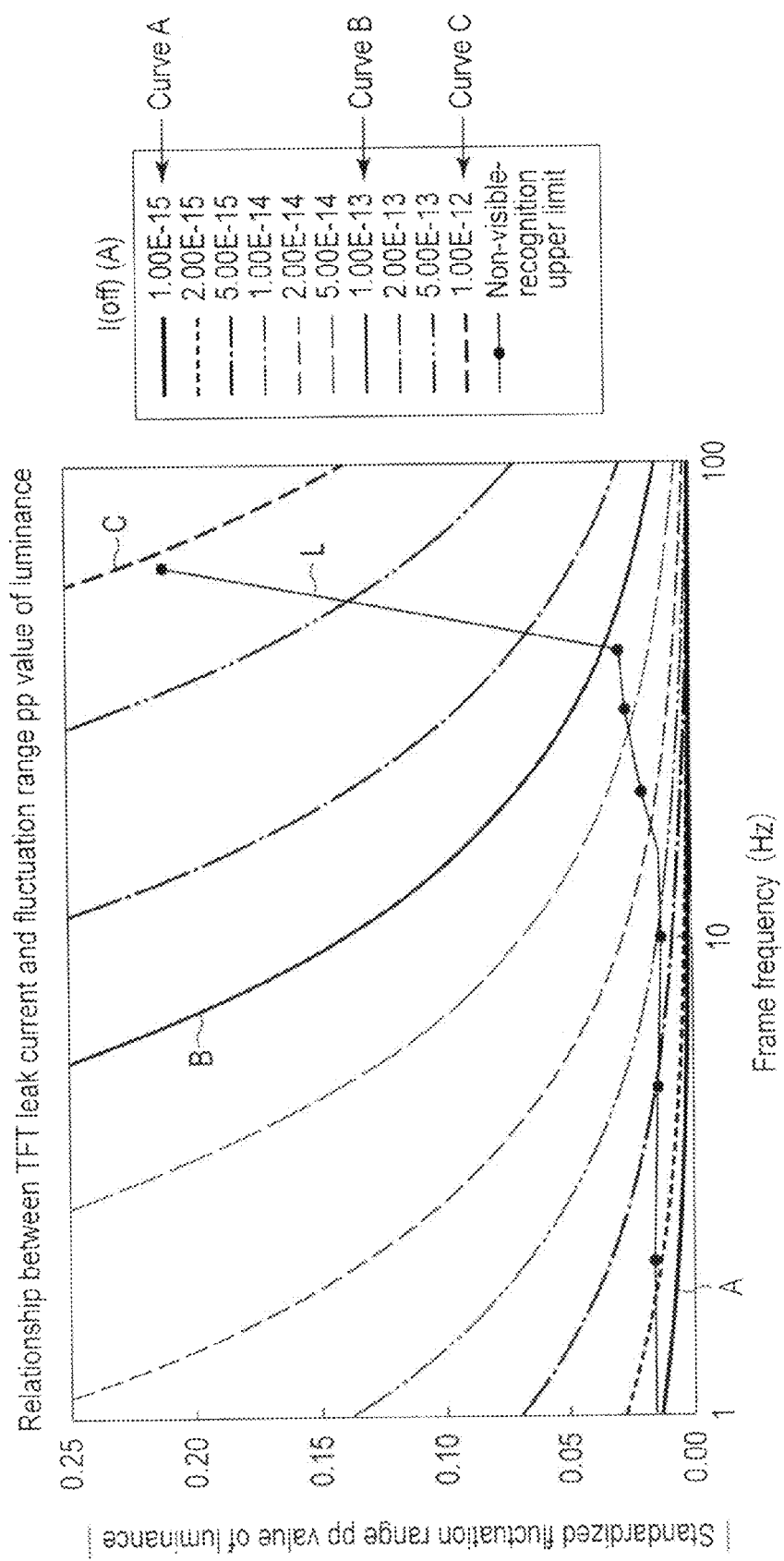
FIG. 5 is a view showing fluctuation ranges of luminances respect to TFTs whose leak currents are different from each other, the view of FIG. 4 showing characteristics being applied to FIG. 5.

FIG. 5 is a view showing a luminance fluctuation occurring in TFTs whose leak currents are different in value from each other, with the view of FIG. 4 applied to the view of FIG. 5. Curve A indicates a relationship between the frame frequency and the fluctuation range of the luminance in the case where a leak current (I (off)) is $1\times10^{-15}$ (A). Curve B indicates also a relationship between the frame frequency and the fluctuation range of the luminance in the case where the leak current (I (off)) is $1\times10^{-13}$ (A) which is a characteristic of a conventional TFT. Curve C indicates a relationship between the frame frequency and the fluctuation range of the luminance in the case where the leak current (I (off)) is $1\times10^{-12}$ (A).

With respect to curves A-C, a flicker is visibly recognized in a region located upper than a character curve L indicating an upper limit of a region at which a flicker is not visibly recognized. It can be seen that as the leak current increases, at a higher frame frequency, a flicker is visibly recognized. Furthermore, in curve B (the conventional TFT), at a frame frequency of 40 Hz or less, a flicker is visibly recognized. In order that a flicker should not be visibly recognized at 1 Hz, it is necessary as a requirement that as indicated in curve A, the leak current is $1\times10^{-15}$ (A) or less.

Therefore, it is possible to prevent a flicker from being visibly recognized, by selecting a TFT to be applied, in accordance with a frame frequency band to be applied, based on FIG. 5.

A symmetric component and an antisymmetric component to be applied in studying how to handle a luminance fluctuation at the time of performing a low-frequency driving will be explained.

FIGS. 6A-6C are views for use in explaining a symmetric component and an antisymmetric component in the liquid crystal display device according to the embodiment.

FIG. 6A shows a luminance response of a single pixel in the case where driving is performed in a frame period of 50 msec (at a frame frequency of 20 Hz). In the figure, a vertical axis indicates luminance, and a horizontal axis indicates time. It should be noted that the luminance is standardized such that an average value is 1. The polarity of a video signal to be written to the pixel is inverted in units of one frame, and intervals indicated by arrows in the figure correspond to a negative frame and a positive frame, respectively.

In the luminance response as shown in FIG. 6A, in the positive frame, the luminance is increased to approximately 1.3, and in the negative frame, the luminance is decreased to approximately 0.8. Thus, the luminance in the positive frame is greatly different from that in the negative frame. This is because the response of a liquid crystal varies in accordance with whether a voltage having a positive polarity or that having a negative polarity is applied.

It should be noted that the symmetric component corresponds to an average waveform of the luminance waveform of the positive frame and that of the negative frame. In the symmetric component, each time the frame changes, the same waveform (symmetric waveform) is obtained. That is why it is referred to as a symmetric component. FIG. 6B shows an example of the symmetric component. If the symmetric waveform has a flat characteristic, it means that it is averaged to have a flat characteristic. Thus, when driving is performed in the line-inversion drive scheme, the column-inversion drive scheme or the dot-inversion drive scheme in the above manner, it can be visibly recognized that the fluctuation range of the luminance is small (a flicker does not occur). However, the symmetric component does not have a flat characteristic. Therefore, the symmetric component is a component which is not eliminated even by the inversion drive scheme.

On the other hand, the antisymmetric component corresponds to a waveform which is expressed, after determining an average waveform of the luminance waveform of the positive waveform and that of the negative waveform, with the average waveform determined as zero (a reference). Therefore, a positive waveform and a negative waveform appear. That is why the above component is referred to as an antisymmetric component. FIG. 6C shows an example of the antisymmetric component. If the antisymmetric component has a symmetric characteristic with respect to a reference line, it is visibly recognized as a component in which the luminance does not fluctuate (no flicker occurs), when driving is performed in the line-inversion drive scheme, the column-inversion drive scheme or the dot-inversion drive scheme. The antisymmetric component is symmetric with respect to the reference line. Therefore, the antisymmetric component is a component which can be eliminated by the inversion drive scheme.

According to the above study, the luminance fluctuation due to the leak current of the TFT is the luminance fluctuation of the symmetric component. Thus, this cannot be prevented by the inversion driving.

The above explanation is given with respect to a current leak of a TFT due to which a flicker is visibly recognized at the time of performing the low frequency driving. However, a flicker caused by a cell is also visibly recognized; that is, it is another cause for a flicker visibly recognized. The inventors made researches on how to restrict a flicker occurring due to a cell, and clarified that occurrence of a flicker is influenced by impedances of a liquid crystal and an alignment film.

FIGS. 7A and 7B are views for use in explaining a variation of a liquid crystal holding voltage which occurs due to an impedance mismatch between a liquid crystal and an alignment film with respect to the liquid crystal display device according to the embodiment.

A model of an equivalent circuit of a liquid crystal panel, which is shown in FIG. 7A, includes a holding capacitance Cs which is present in an region with respect to which a pixel electrode PE and a counter-electrode COM are located opposite to each other, a capacitance C2 of an alignment film which corresponds to an electric field generated in the liquid crystal layer LQ, and a liquid crystal capacitance C1. Furthermore, resistances R1 and R2 are provided in parallel with the liquid crystal capacitance C1 and the capacitance C2, respectively. It should be noted that the holding capacitance Cs, the capacitance C2 and the liquid crystal capacitance C1 correspond to the capacitance component Cs0, Cs1 and Clc as shown in FIG. 2.

Next, a variation of a liquid crystal holding voltage which occurs due to the impedance mismatch between the liquid crystal and the alignment film will be explained with reference to FIG. 7B.

In case 1, impedances of a liquid crystal and an alignment film do not match to each other (R1·C1<R2·C2). In this case, when a TFT is turned off to be in a pixel voltage holding state, the liquid crystal and the alignment film are discharged independently, but charge is supplied from the holding capacitance Cs in such a manner as to compensate for attenuation of voltages V1 and V2 which is caused by the above discharge. However, although the amount of charge decreased due to the discharge on the liquid crystal holding voltage V1 side is larger than that on the voltage V2 side, the amount of charge supplied on the V1 side is equivalent to that on the V2 side. Therefore, with the passage of time, the voltage V1 is decreased, and the voltage V2 is increased. Therefore, in case 1, the liquid crystal holding voltage attenuates, and the luminance fluctuates.

In case 2, impedances of a liquid crystal and an alignment film match to each other (R1·C1≈R2·C2). In this case, when a TFT is turned off to be in a pixel voltage holding state, the liquid crystal and the alignment film are discharged independently. However, discharging time of the liquid crystal side and that of the alignment film side are the same as each other, since the impedances match to each other. Thus, decreasing of charge due to the discharge and supplying of charge from the holding capacitance Cs are balanced, thus keeping the voltages V1 and V2 constant. Therefore, in case 3, the fluctuation of the luminance is reduced, and the flicker is reduced.

In case 3, impedances of a liquid crystal and an alignment film do not match to each other (R1·C1>R2·C2). In this case, when a TFT is turned off to be in a pixel voltage holding state, the liquid crystal and the alignment film are discharged independently, but charge is supplied from the holding capacitance Cs in such a manner as to compensate for attenuation of voltages V1 an V2 which is caused by the above discharge. However, although the amount of charge decreased due to the discharge on the alignment film voltage V2 side is larger than that on the voltage V1 side, the amount of charge supplied on the V2 side is equivalent to that on the V1 side. Therefore, with the passage of time, the voltage V2 is decreased, and the voltage V1 is increased. Therefore, in case 3, the liquid crystal holding voltage increases, and the luminance fluctuates.

The variation of the liquid crystal holding voltage is confirmed by making a simulation calculation with respect to the above circuit model.

FIGS. 8A and 8B are views showing a circuit model applied to a simulation performed with respect to the liquid crystal display device according to the embodiment and calculation conditions. FIG. 8A shows the circuit model, and FIG. 8B shows calculation conditions. It should be noted that with respect to the calculation conditions, a frame period of 0.5 seconds (frame frequency of 2 Hz) is applied to intermittent driving.

Figure 9A:
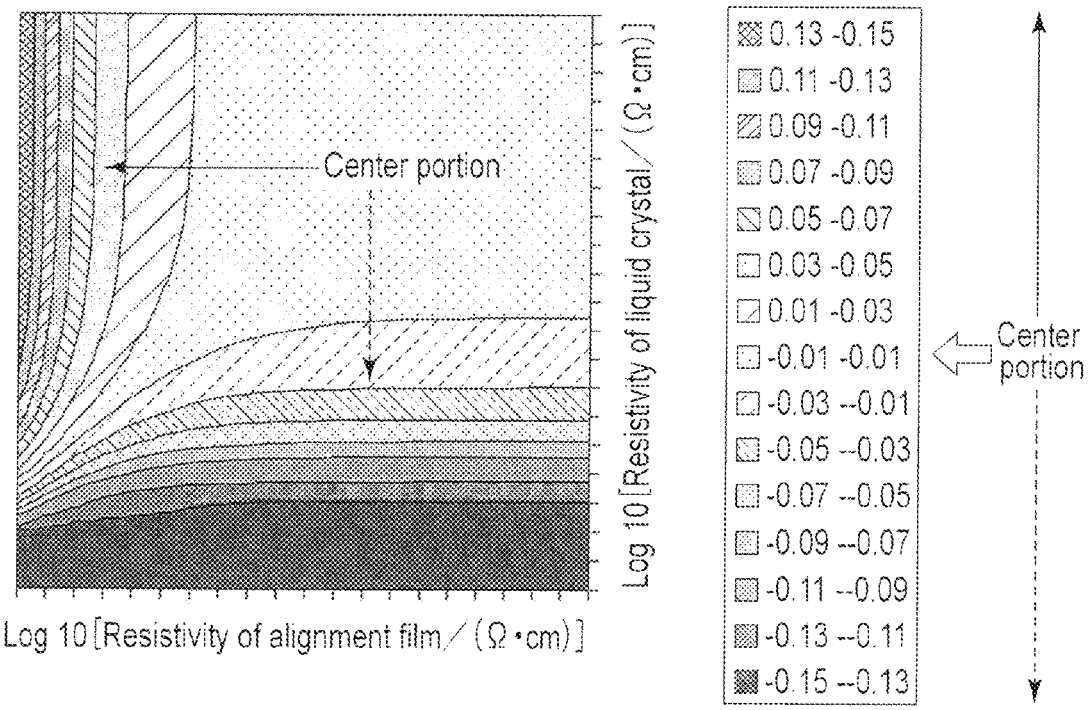
FIG. 9A is a view showing a result of the simulation with respect to a change rate of a liquid crystal applying voltage in a holding period in the liquid crystal display device according to the embodiment.
Figure 9B:
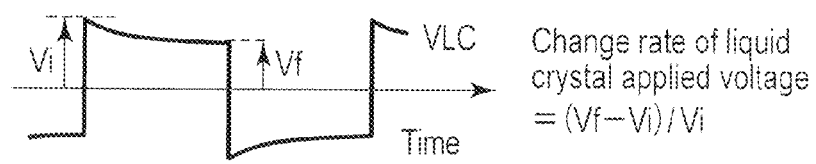
FIG. 9B is a view showing the change rate of the liquid crystal display device according to the embodiment.

FIGS. 9A and 9B are views showing a result of a simulation performed with respect to a change rate of a liquid crystal applied voltage in a holding period in the liquid crystal display device according to the embodiment. FIG. 9A shows a change rate of the liquid crystal applied voltage in association with a resistivity of the alignment film and that of the liquid crystal. It should be noted that the change rate of the liquid crystal applied voltage is an index indicating a rate of a decreased or increased liquid crystal applied voltage in the holding period, and is a value as (Vf−Vi)/Vi as shown in FIG. 9B.

A center portion in FIG. 9A is a region in which the change rate of the liquid crystal applied voltage is the smallest. The change rate of the liquid crystal applied voltage increases as the resistivity of the alignment film decreases, as indicated by an arrow of a solid line in the figure. On the other hand, the change rate of the liquid crystal applied voltage decreases as the resistivity of the liquid crystal decreases, as indicated by an arrow of a dotted line in the figure. Also, from this result of the simulation, it can be seen that a luminance fluctuation in a single frame can be reduced by matching the impedances of the liquid crystal and the alignment film to each other.

It should be noted that an upper limit of an absolute value of a luminance gradient in a single frame in which a flicker is not visibly recognized is determined as 0.03 by a subjective evaluation. Therefore, it is possible to set the absolute value of the luminance gradient in the single frame to 0.03 or less by selecting resistivities (Ω·cm) of the liquid crystal and the alignment film based on the simulation result as shown in FIG. 9A.

For the reason given in the above explanation, it is possible to achieve a liquid crystal display device in which a flicker is reduced by combining an appropriate frame frequency, appropriate TFT off-leak current and appropriate impedances of a liquid crystal and an alignment film.

FIG. 10 is a view showing a structure for reducing a flicker in the liquid crystal display device according to the embodiment.

In each of cases 1 and 2 as shown in FIG. 10, the frame frequency is 1-10 Hz. In this case, as shown in FIG. 5, it is possible to reduce a flicker by applying a TFT whose off-leak current is $1 \times 10^{-15}$ A or less, and also matching impedances of a liquid crystal and an alignment film to each other.

Figure 11:
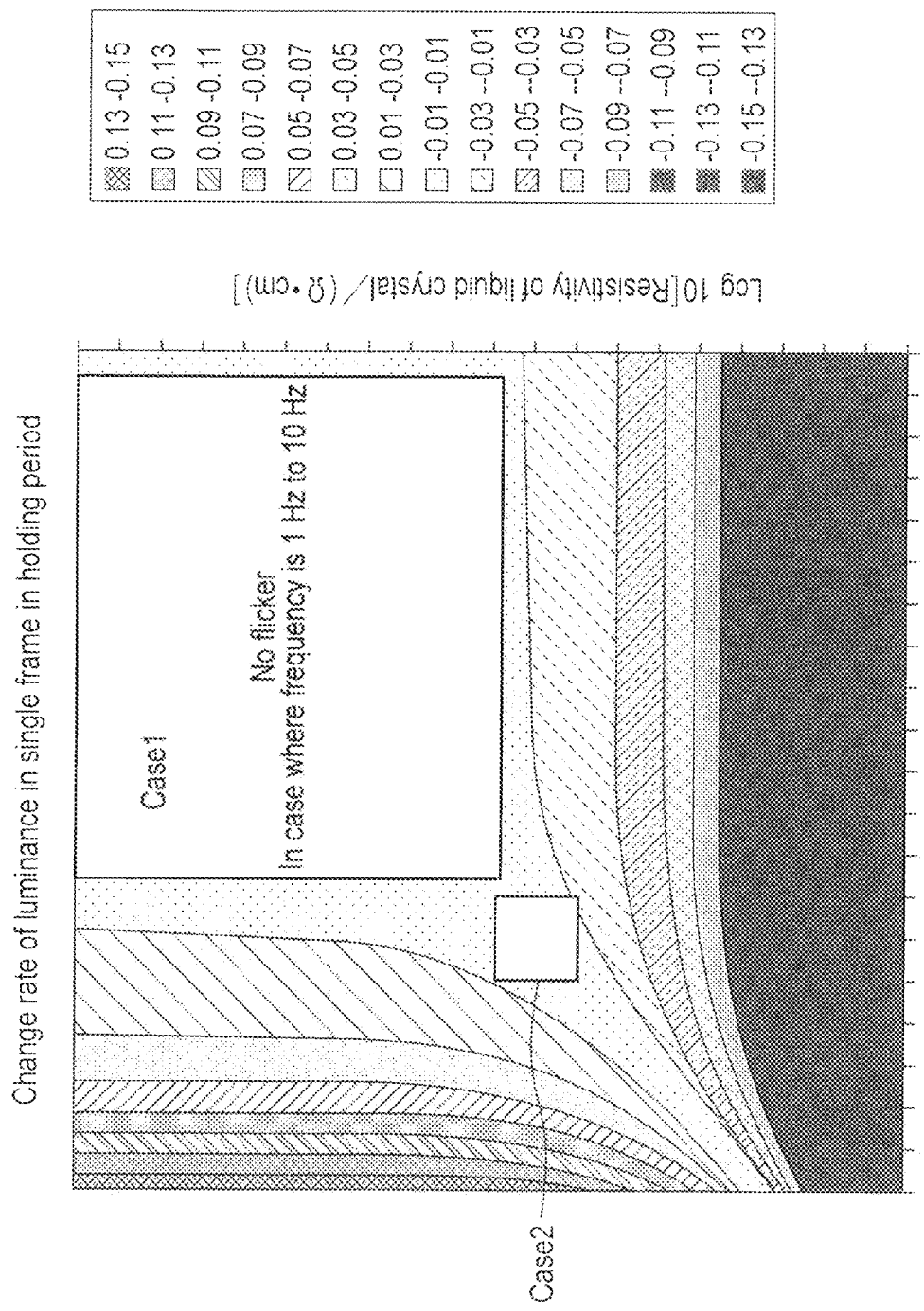
FIG. 11 is a view showing regions regarding impedances of liquid crystals and alignment films in cases 1 and 2 in the liquid crystal display device according to the embodiment.

FIG. 11 is a view showing regions regarding impedances of liquid crystals and alignment films in cases 1 and 2 in the liquid crystal display device according to the embodiment. In the regions indicated with respect to cases 1 and 2, the absolute value of a change rate of luminance is 0.01 or less. In case 1, the resistivity of the liquid crystal falls within the range of $5 \times 10^{13}$ to $5 \times 10^{14}$ Ω·cm, and that of the alignment film falls within the range of $5 \times 10^{13}$ to $5 \times 10^{14}$ Ω·cm. In case 2, the resistivity of the liquid crystal falls within the range of $1 \times 10^{13}$ to $5 \times 10^{13}$ Ω·cm, and that of the alignment film falls within the range of $1 \times 10^{13}$ to $5 \times 10^{13}$ Ω·cm.

In each of cases 3 and 4 as shown in FIG. 10, the frame frequency is 10-20 Hz. In this case, as shown in FIG. 5, it is possible to reduce a flicker by applying a TFT whose off-leak current is $1 \times 10^{-15}$ A or less, and matching impedances of a liquid crystal and an alignment film to each other.

Figure 12:
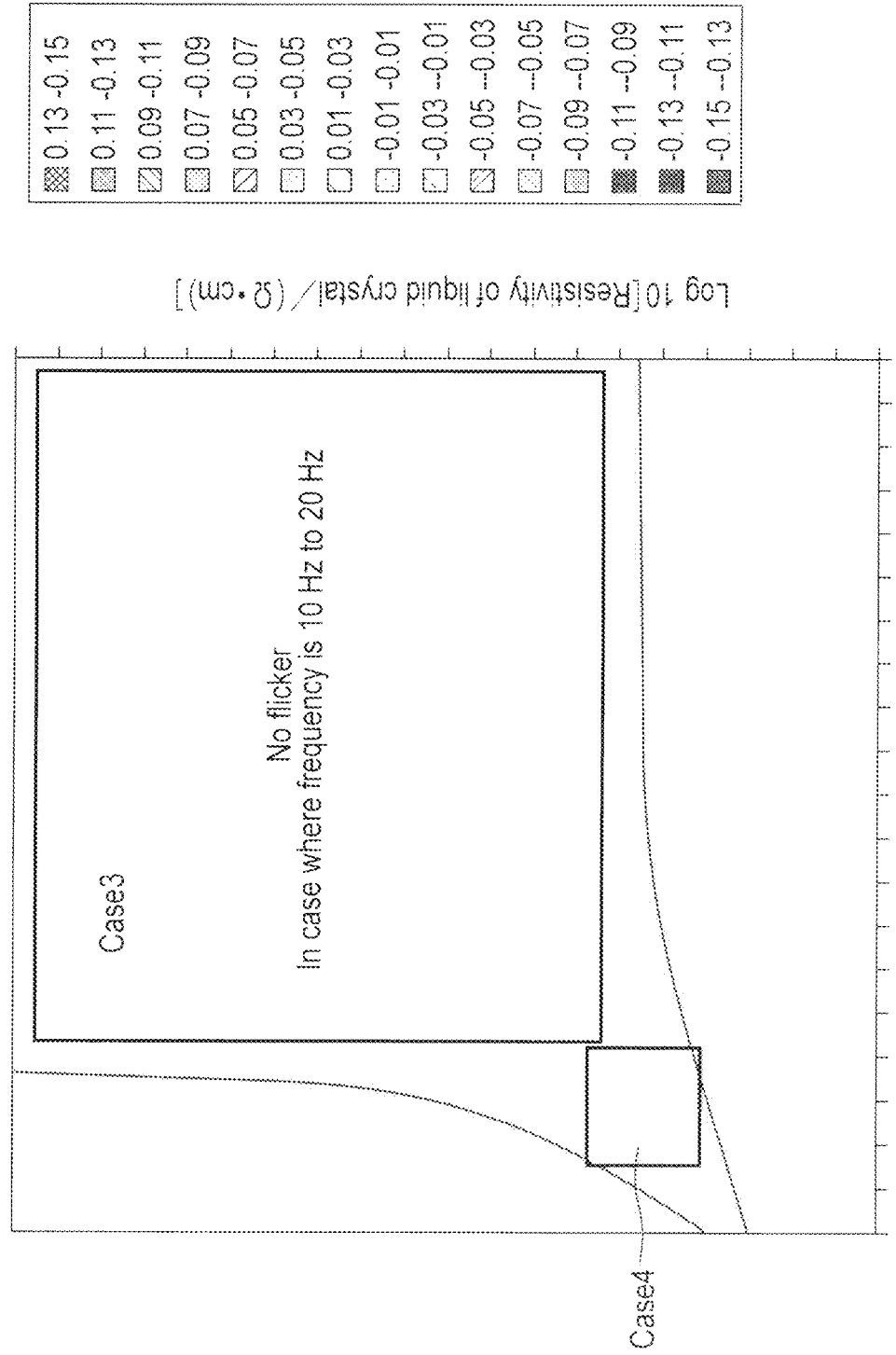
FIG. 12 is a view showing regions regarding impedances of liquid crystals and alignment films in cases 3 and 4 in the liquid crystal display device according to the embodiment.

FIG. 12 is a view showing regions regarding impedances of the liquid crystals and alignment films in cases 3 and 4 in the liquid crystal display device according to the embodiment. In the regions indicated with respect to cases 3 and 4, the absolute value of a change rate of luminance is 0.03 or less. In case 3, the resistivity of the liquid crystal falls within the range of $5 \times 10^{12}$ to $5 \times 10^{14}$ Ω·cm, and that of the alignment film falls within the range of $5 \times 10^{12}$ to $5 \times 10^{14}$ Ω·cm. In case 4, the resistivity of the liquid crystal falls within the range of $1 \times 10^{12}$ to $5 \times 10^{12}$ Ω·cm, and that of the alignment film falls within the range of $1 \times 10^{12}$ to $5 \times 10^{12}$ Ω·cm.

In each of cases 5 and 6 as shown in FIG. 10, the frame frequency is 10-20 Hz, and the TFT off-leak current is $1 \times 10^{-15}$ to $1 \times 10^{-14}$ A. In this case, as shown in FIG. 5, the luminance fluctuation value is great, and a flicker is thus visibly recognized. Thus, the impedances of the liquid crystal and the alignment film are set so that the liquid crystal holding voltage is increased as shown in case 3 in FIG. 7B. Thereby, it is possible to reduce the flicker by compensating for decreasing of the luminance due to the TFT off-leak with increasing of the luminance due to the impedance mismatch between the liquid crystal and the alignment film.

FIG. 13 is a view showing regions regarding impedances of liquid crystals and alignment films in cases 5 and 6 in the liquid crystal display device according to the embodiment. In regions indicated with respect to cases 5 and 6 (regions defined by solid lines), the regions indicated with respect to cases 3 and 4 (regions defined by dotted lines) are shifted leftwards. That is, the luminance is increased by setting the resistivity of the alignment film to a low value. In case 5, the resistivity of the liquid crystal falls within the range of $5 \times 10^{12}$ to $5 \times 10^{14}$ Ω·cm, and that of the alignment film falls within the range of $5 \times 10^{11}$ to $5 \times 10^{13}$ Ω·cm. In case 6, the resistivity of the liquid crystal falls within the range of $1 \times 10^{12}$ to $5 \times 10^{12}$ Ω·cm, and that of the alignment film falls within the range of $1 \times 10^{11}$ to $5 \times 10^{11}$ Ω·cm.

In each of cases 7 and 8 as shown in FIG. 10, the frame frequency is 10-20 Hz, and the TFT off-leak current is $1 \times 10^{-14}$ to $1 \times 10^{-13}$ A. In this case, as shown in FIG. 5, the luminance fluctuation value is great, and a flicker is thus visibly recognized. Thus, the impedances of a liquid crystal and an alignment film are set so that the liquid crystal holding voltage is increased as shown in case 3 in FIG. 7B. Thereby, it is possible to reduce the flicker by compensating for decreasing of the luminance due to the TFT off-leak with increasing of the luminance due to the impedance mismatch between the liquid crystal and the alignment film.

Figure 14:
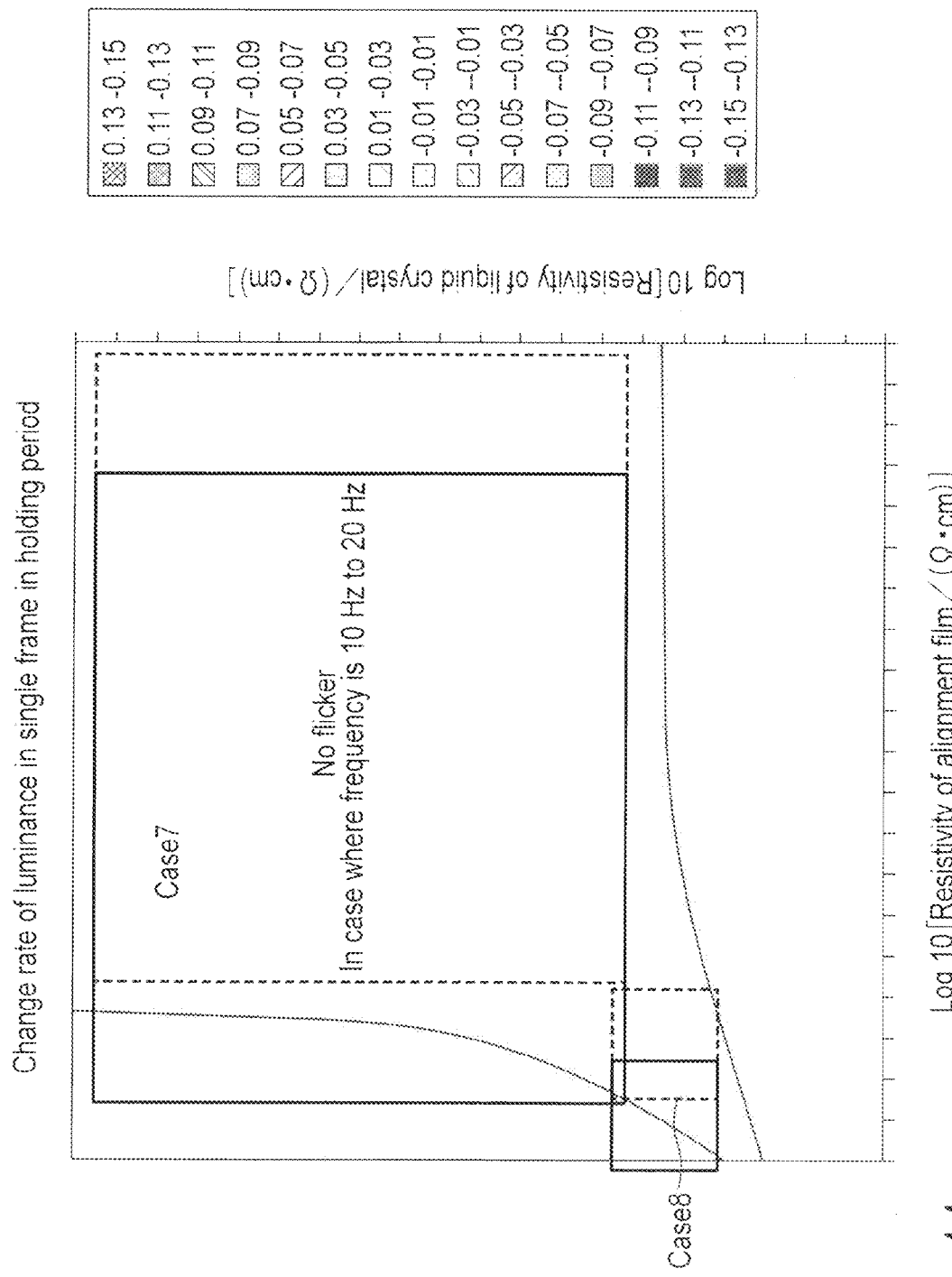
FIG. 14 is a view showing regions regarding impedances of liquid crystals and alignment films in cases 7 and 8 in the liquid crystal display device according to the embodiment.

FIG. 14 is a view showing regions regarding impedances of liquid crystals and alignment films in cases 7 and 8 in the liquid crystal display device according to the embodiment. In regions indicated with respect to cases 7 and 8 (regions defined by solid lines), the regions indicated with respect to cases 3 and 4 (regions defined by dotted lines) are further shifted leftwards. That is, the luminance is further increased by setting the resistivity of the alignment film to a lower value. In case 7, the resistivity of the liquid crystal falls within the range of $5 \times 10^{12}$ to $5 \times 10^{14}$ Ω·cm, and that of the alignment film falls within the range of $1 \times 10^{11}$ to $1 \times 10^{13}$ Ω·cm. In case 8, the resistivity of the liquid crystal falls within the range of $1 \times 10^{12}$ to $5 \times 10^{12}$ Ω·cm, and that of the alignment film falls within the range of $5 \times 10^{10}$ to $1 \times 10^{11}$ Ω·cm.

In case 9 as shown in FIG. 10, the frame frequency is 1-10 Hz. In this case, it is possible to reduce a flicker by applying a TFT whose off-leak current is $1 \times 10^{-15}$ A or less, and matching the impedances of a liquid crystal and an alignment film to each other, as shown in FIG. 5.

Figure 15:
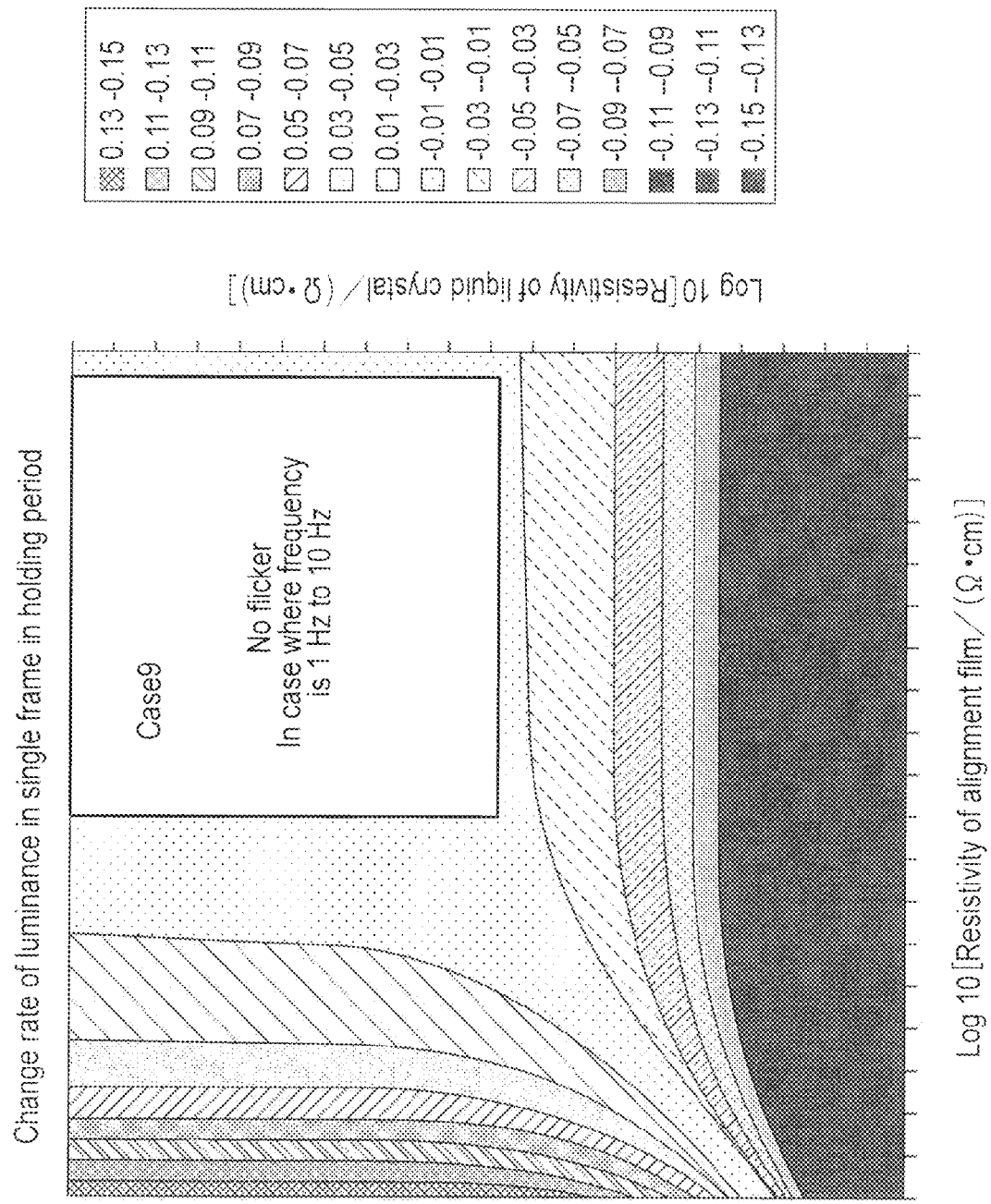
FIG. 15 is a view showing regions regarding impedances of a liquid crystal and an alignment film in case 9 in the liquid crystal display device according to the embodiment.

FIG. 15 is a view showing regions regarding of impedances of a liquid crystal and an alignment film in case 9 in the liquid crystal display device according to the embodiment. In a region indicated with respect to case 9, the absolute value of a change rate of luminance is 0.01 or less. In case 9, the resistivity of the liquid crystal falls within the range of $5 \times 10^{13}$ to $5 \times 10^{14}$ Ω·cm, and that of the alignment film falls within the range of $1 \times 10^{14}$ to $5 \times 10^{14}$ Ω·cm. It is possible to maintain a satisfactory flicker characteristic by setting the lower limit of the resistivity of the alignment film to a high value, as compared with case 1, even if the resistivity of the alignment film varies with the passage of time.

Also, the inventors clarified that the resistance of the alignment film lowers due to the entry of moisture from a panel peripheral portion. The entry of moisture from the panel peripheral portion easily occurs in the case where a peripheral seal material provided in an area other than an effective display area is made thin. In the case where the width of the seal material was 1.5 mm or less, it was possible to set the absolute value of the change rate of luminance to 0.01 or less even under strict environment conditions such as a high-humidity environment, by setting the resistivities of a liquid crystal and an alignment film to those of case 9.

In case 10 as shown in FIG. 10, the frame frequency is 10-20 Hz. In this case, it is possible to reduce a flicker by applying a TFT whose TFT off-leak current is $1 \times 10^{-15}$ A or less, and matching the impedances of a liquid crystal and an alignment film to each other, as shown in FIG. 5.

Figure 16:
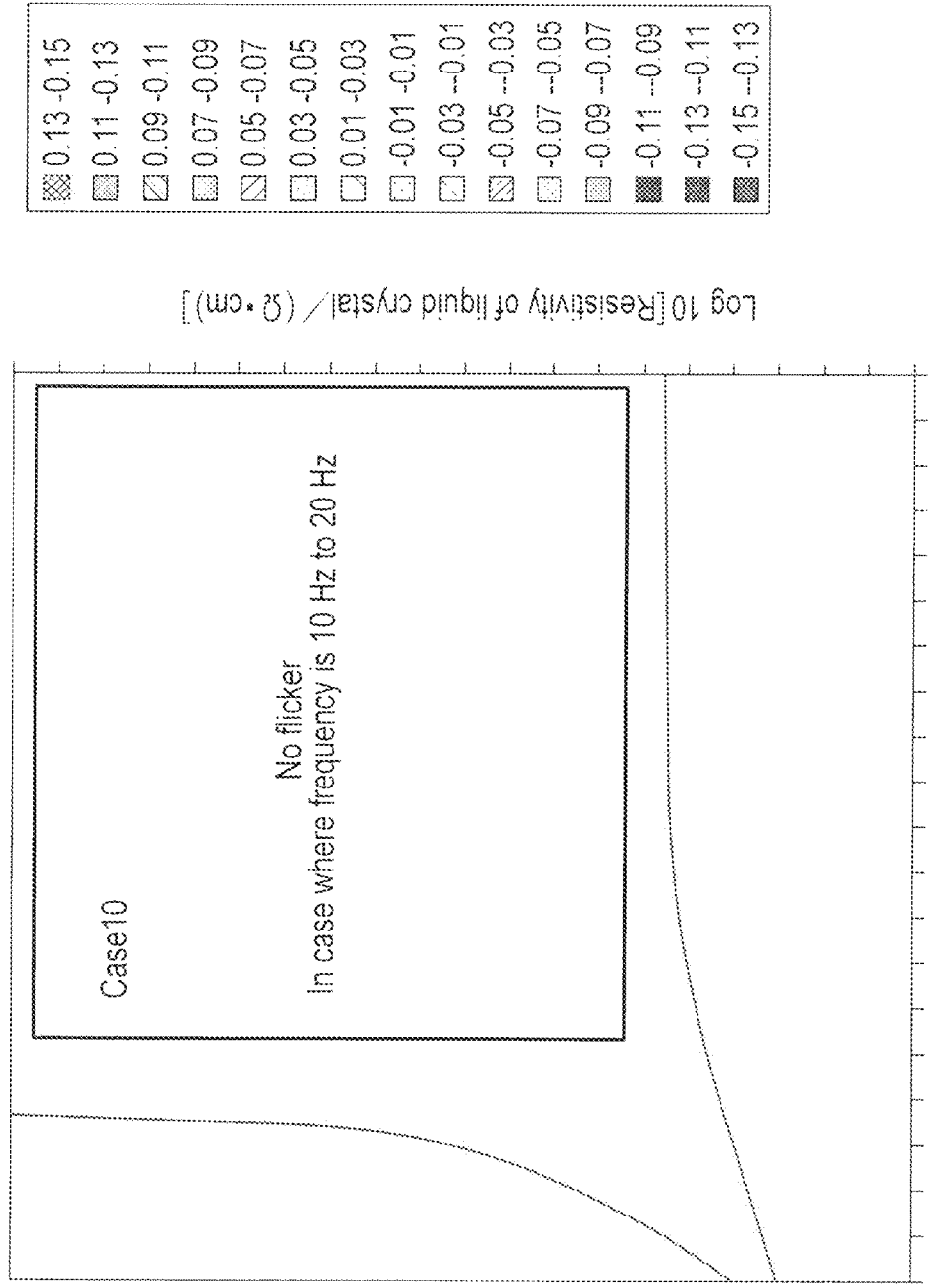
FIG. 16 is a view showing regions regarding impedances of a liquid crystal and an alignment film in case 10 in the liquid crystal display device according to the embodiment.

FIG. 16 is a view showing regions regarding impedances of a liquid crystal and an alignment film in case 10 in the liquid crystal display device according to the embodiment. In a region indicated with respect to case 10, the absolute value of a luminance fluctuation rate is 0.03 or less. In case 10, the resistivity of the liquid crystal falls within the range of $5 \times 10^{12}$ to $5 \times 10^{14}$ Ω·cm, and that of the alignment film falls within the range of $1 \times 10^{13}$ to $5 \times 10^{14}$ Ω·cm. Case 10 is effective in the case where the width of the seal material is 1.5 mm or less, as in case 9. That is, it was possible to set the absolute value of the luminance fluctuation rate to 0.03 or less even under strict environment conditions against the entry of moisture from the panel peripheral portion, such as a high-humidity environment.

As explained above, it is possible to achieve a liquid crystal display device in which a flicker is restricted, by combining an appropriate frame frequency, appropriate TFT off-leak current and appropriate impedances of a liquid crystal and an alignment film.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A lateral electric-field type of liquid crystal display device comprising:
a display panel in which a plurality of liquid crystal pixels and TFTs are arranged in a matrix, the TFTs being configured to perform or stop application of pixel voltages to the liquid crystal pixels; and a controller configured to perform intermittent driving to rewrite image signals to the liquid crystal pixels, wherein a frame frequency falls within a range of 1 Hz to 10 Hz, an off-leak current of each of the TFTs has a value of $1 \times 10^{-15}$ A or less, a resistivity of a liquid crystal applied to each of the liquid crystal pixels and a resistivity of an alignment film applied to the liquid crystal pixels both fall within one of a first range and a second range, the first range being set as a range of $1 \times 10^{13}$ to $5 \times 10^{13}$ Ω·cm, the second range being set as a range of $5 \times 10^{13}$ to $5 \times 10^{14}$ Ω·cm, and a relationship of "R1×C1≈R2×C2" is satisfied, where R1 is a resistance of the liquid crystal with respect to said each liquid crystal pixel, C1 is a capacity of the liquid crystal with respect to said each liquid crystal pixel, R2 is a resistance of the alignment film with respect to said each liquid crystal pixel, and C2 is a capacity of the alignment film with respect to said each liquid crystal pixel.

2. A lateral electric-field type of liquid crystal display device comprising:

a display panel in which a plurality of liquid crystal pixels and TFTs are arranged in a matrix, the TFTs being configured to perform or stop application of pixel voltages to the liquid crystal pixels; and a controller configured to perform intermittent driving to rewrite image signals to the liquid crystal pixels, wherein a frame frequency falls within a range of 10 Hz to 20 Hz, an off-leak current of each of the TFTs has a value of $1 \times 10^{-15}$ A or less, a resistivity of a liquid crystal applied to the liquid crystal pixels and a resistivity of an alignment film applied to the liquid crystal pixels both fall within one of a first range and a second range, the first range being set as a range of $1 \times 10^{12}$ to $5 \times 10^{12}$ Ω·cm, the second range being set as a range of $5 \times 10^{12}$ to $5 \times 10^{14}$ Ω·cm, and a relationship of "R1×C1≈R2×C2" is satisfied, where R1 is a resistance of the liquid crystal with respect to said each liquid crystal pixel, C1 is a capacity of the liquid crystal with respect to said each liquid crystal pixel, R2 is a resistance of the alignment film with respect to said each liquid crystal pixel, and C2 is a capacity of the alignment film with respect to said each liquid crystal pixel.

* * * * *